June 18, 1968     D. M. KERCHER ET AL     3,388,888
COOLED TURBINE NOZZLE FOR HIGH TEMPERATURE TURBINE
Filed Sept. 14, 1966     2 Sheets-Sheet 1
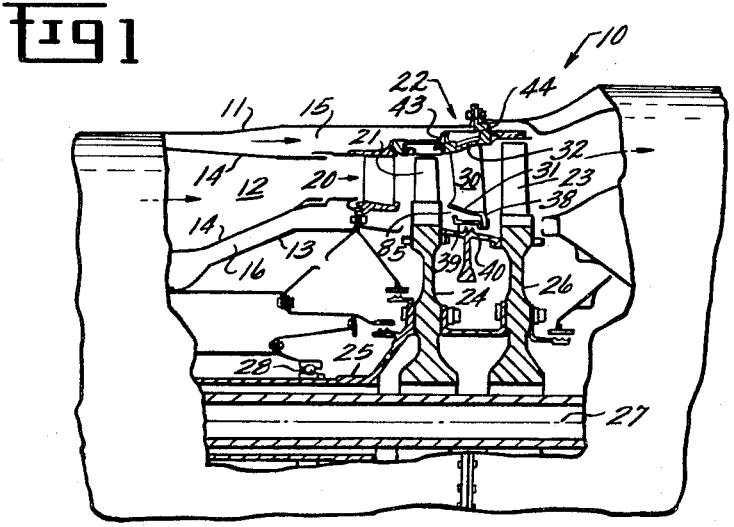
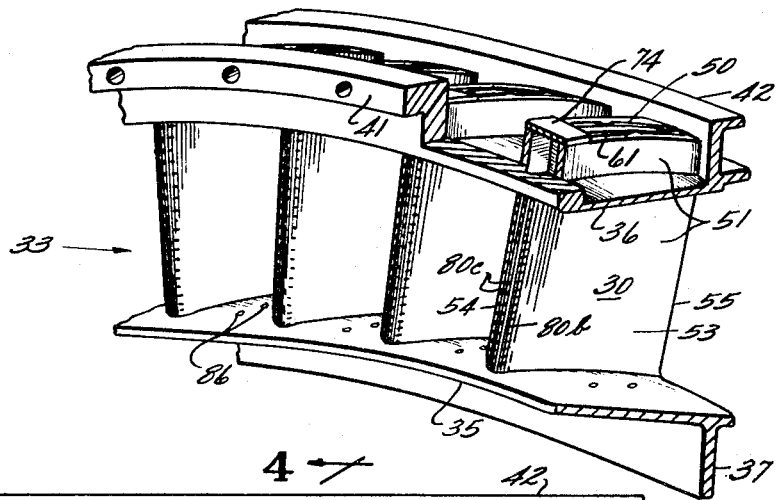
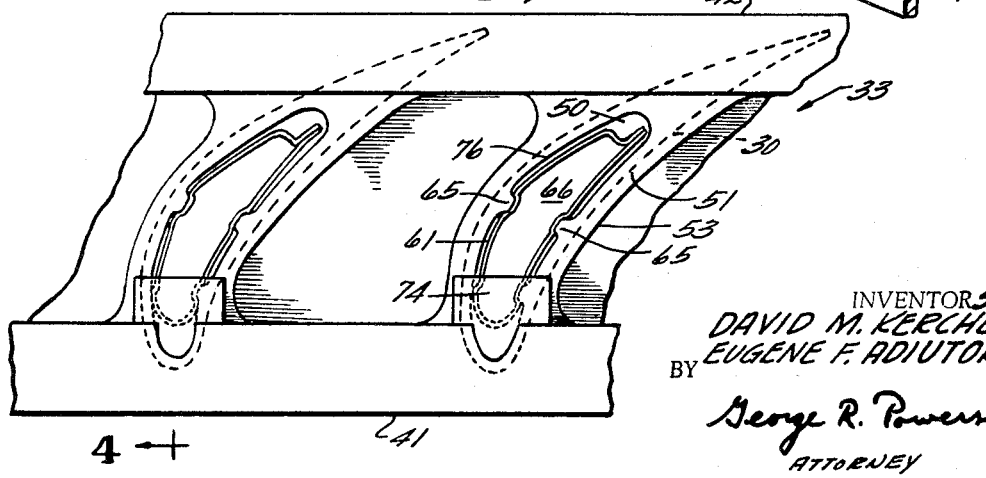
INVENTORS.
DAVID M. KERCHER
EUGENE F. ADIUTORI
BY George R. Powers
ATTORNEY

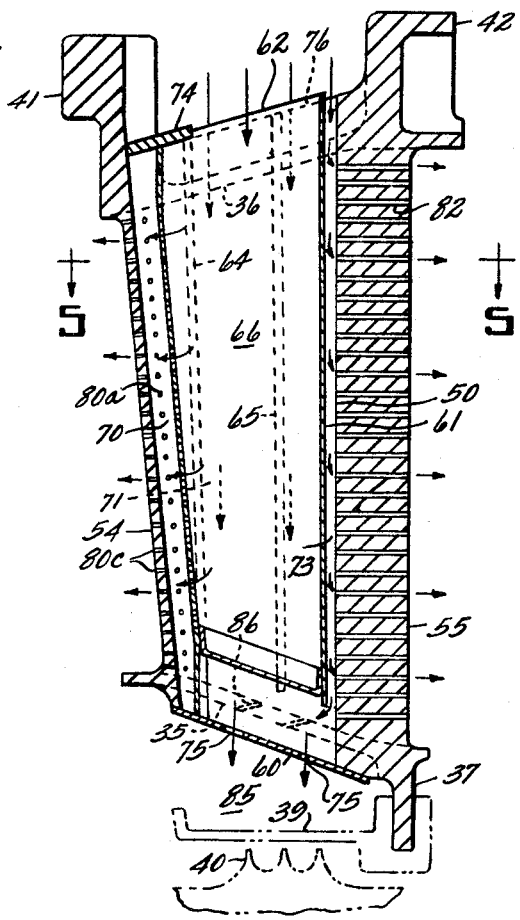
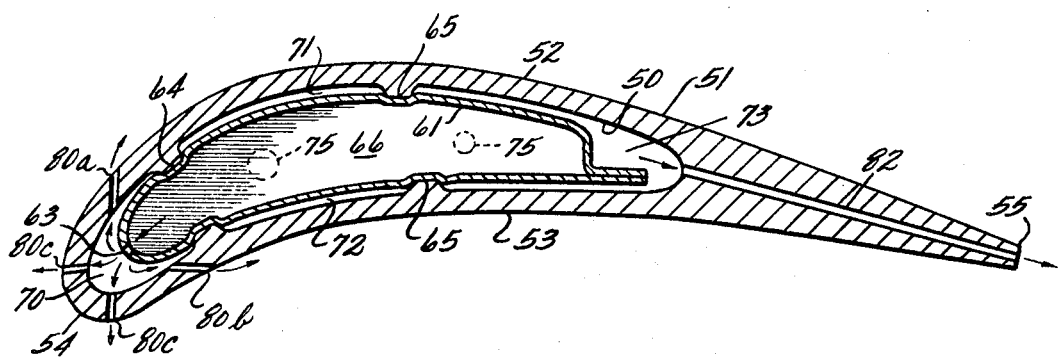

United States Patent Office 3,388,888
Patented June 18, 1968

3,388,888
COOLED TURBINE NOZZLE FOR HIGH
TEMPERATURE TURBINE
David M. Kercher and Eugene F. Adiutori, Cincinnati,
Ohio, assignors to General Electric Company, a corporation of New York
Filed Sept. 14, 1966, Ser. No. 579,324
9 Claims. (Cl. 253—39.1)

ABSTRACT OF THE DISCLOSURE

A hollow vane body has internal partitions dividing the vane interior into a plurality of radially extending regions including a centrally disposed plenum and separate passages intermediate the central plenum and the leading and trailing edges and the convex and concave side walls. A heat transfer fluid is introduced into the centrally disposed plenum and selected ones of the surrounding passages, from which the fluid is directed in an effective and efficient manner to adequately cool all portions of the vane body.

---

This invention relates to cooled stator structure for high temperature turbomachines and, more particularly, to a turbine nozzle diaphragm assembly having improved means for controlling and directing the flow of cooling fluid throughout the assembly. The invention especially relates to a turbine vane construction by which cooling fluid is distributed through the interior and over the exterior surfaces of the vane in an efficient and adequate manner.

It is well known that the efficiency of a gas turbine engine is related to the operating temperature of the turbine and that the efficiency may be increased, in theory, by increasing the operating temperature. As a practical matter, however, the maximum turbine operating temperature is limited by the high temperature capabilities of the various turbine elements. Since the engine efficiency is thus limited by temperature considerations, turbine designers have expended considerable effort toward increasing the high temperature capabilities of turbine elements, particularly the airfoil shaped vanes upon which high temperature combustion products impinge. Some increase in engine efficiency has been obtained by the development and use of new materials capable of withstanding higher temperatures. These new materials are not, however, generally capable of withstanding the extremely high temperatures desired in modern gas turbines. Consequently, various cooling arrangements for vanes have been devised for extending the upper operating temperature limit by keeping the vane material at the lower temperatures which it is capable of withstanding without pitting or burning out. As used herein, the term "vane" is a generic term referring to airfoil-shaped elements used in high temperature turbomachines. As such, the term applies not only to those members popularly known as vanes, but also to other airfoil shaped members commonly known as blades, buckets, etc.

Cooling of vanes is generally accomplished by providing internal flow passages within the vanes to accommodate the flow of a cooling fluid, the fluid typically being compressed air bled from either the compressor or the combustor. It is also well known that the engine efficiency theoretically possible is reduced by the extraction of cooling air. It is therefore imperative that cooling air be utilized effectively, lest the decrease in efficiency caused by the extraction of the air be greater than the increase resulting from the higher turbine operating temperature. In other words, the cooling system must be efficient from the standpoint of minimizing the quantity of cooling air required. It is also essential that all portions of the turbine vanes be cooled adequately. In particular, adequate cooling must be provided for the leading and trailing edges of the vanes, these portions being most adversely affected by the high temperature combustion gases.

It has been found that cooling configurations available in the past have tended to have deficiencies with respect to the foregoing requirements. Cooling systems which use minimum quantities of cooling air commonly fail to cool adequately all portions of the vane. As a result, a critical portion such as the leading edge may crack, burn out, or pit after a relatively short operating period. On the other hand, those systems which adequately cool all portions of the vane, including the leading and trailing edges, commonly require too much air for efficient overall engine performance, the reason being that the cooling air is not used efficiently. For example, an inefficient arrangement may direct the cooling air through the interior of the vane in a manner which results in the creation of low convection heat transfer coefficients or rates of heat transfer. Other characteristics, such as inadequate heat transfer area, can also prevent effective use of the cooling air.

The airfoil-shaped vanes are not, of course, the only turbine elements exposed to the high temperature combustion products. It will therefore be obvious to those skilled in the art that it may be desirable in practice to provide suitable cooling arrangements for other high temperature elements such as, for example, the circumferential band structures commonly used to interconnect the ends of nozzle vanes in a turbine diaphragm assembly. Similarly, cooling provisions may be required for ancillary turbine structure such as seals, shrouds, etc. With respect to the cooling of such elements, it will be appreciated that the above discussion relative to adequate and efficient use of cooling air is applicable to these elements as well as to vanes.

It is therefore an object of this invention to provide for high temperature turbomachines an improved vane structure by which cooling fluid is utilized in a highly efficient manner.

It is another object of this invention to provide for high temperature turbomachines an improved vane structure by which all portions of the vane are cooled adequately.

A further object of this invention is to provide an improved turbine nozzle diaphragm assembly having improved means for controlling and directing the flow of cooling fluid throughout the assembly in an adequate and efficient manner.

A still further object of this invention is to provide the foregoing objects in gas turbine structure that is durable and dependable in operation and relatively simple and inexpensive to manufacture.

Briefly stated, in carrying out the invention in one form, a hollow vane for use in a high temperature turbomachine includes partition means dividing the hollow interior of the vane into a plurality of radially extending heat transfer regions, the regions including a centrally disposed plenum, a leading edge plenum between the central plenum and the leading edge of the vane, and passage means between the central plenum and the side walls of the vane downstream of the leading edge. A cooling fluid such as air is supplied from one end of the vane to the central plenum and the passage means. From the central plenum, the cooling fluid is directed into the leading edge plenum as high velocity jets which impinge on the interior wall surfaces of the leading edge plenum to generate high rates, or coefficients, of convection heat transfer at the leading edge. The cooling fluid flowing through the passage means provides effective convection cooling of the mid-chord region of the vane, the passage means preferably being formed of first, second, and third passages adjacent the convex side wall, the concave side wall, and the trailing edge, respectively, interconnected at the end of the vane opposite the end at which the cooling fluid is introduced. In accordance with a preferred embodiment of the invention, the cooling fluid in the leading edge plenum is discharged through a multiplicity of radially spaced passages interconnecting the plenum and the exterior vane surfaces in the leading edge region, the passage being disposed along axes forming acute angles with the exterior surfaces such that the cooling fluid forms a thin layer of cooling fluid on the exterior wall surfaces to provide film cooling. Moreover, the angular disposition of the passages provides extended convection heat transfer area in the leading edge region. Similarly, after cooling the mid-chord region, the cooling fluid in the passage means is discharged through a multiplicity of radially spaced axial passages interconnecting the third passage and the trailing edge. These passages, which provide a concentration of convection surfaces, assure adequate cooling in the trailing edge region.

By a further aspect of the invention, the partition means dividing the hollow interior of the vane into the heat transfer regions is comprised of a thin-walled insert positioned within the vane body by suitable spacing means such as radial ribs formed integrally with the vane side walls. The central plenum is formed within the insert, and the space between the insert and the side walls of the vane is divided by the spacing means into the leading edge plenum and the first, second, and third passages. To provide effective and efficient cooling, the insert, the spacing means, and the outlet passages in the leading and trailing edges are proportioned to control the flow of cooling fluid through the vane in accordance with the heat transfer requirement of the various portions of the vane.

By a still further aspect of this invention, a turbine nozzle diaphragm assembly is formed of a plurality of vanes circumferentially interconnected by film cooled support bands, the cooling fluid for at least one of the bands having been used previously for cooling the vanes in the manner of this invention.

While the novel features of this invention are set forth with particularity in the appended claims, the invention, both as to organization and content, will be better understood and appreciated, along with other objects and features thereof, from the following detailed description taken in conjunction with the drawings, in which:

FIG. 1 is a sectional view of a portion of a gas turbine engine having a turbine nozzle diaphragm incorporating the present invention;

FIG. 2 is a pictorial view of a portion of the annular nozzle diaphragm of FIG. 1;

FIG. 3 is an outer end view of a portion of the nozzle diaphragm;

FIG. 4 is a view taken along viewing line 4—4 of FIG. 3 showing the vane and associated band and seal structure in longitudinal section; and FIG. 5 is a view taken along line 5—5 of FIG. 4 showing the vane in transverse section.

Referring to the drawings, and particularly to FIG. 1, the high temperature portions of an axial flow gas turbine engine 10 are illustrated, the engine having an outer cylindrical casing 11 circumferentially surrounding the high temperature portions. The illustrated gas turbine structure includes an annular combustion space indicated generally by 12, the combustion space 12 being formed between the cylindrical casing 11 and an inner wall 13. An annular combustion liner 14 is located within the space 12 in spaced relation to the casing 11 and the wall 13, the actual combustion occurring within the annular combustion liner 14. The annular spaces 15 and 16 between the combustion liner 14 and the casing 11 and the wall 13 respectively, are filed with high pressure air discharged by the compressor (not shown). This high pressure air, which is quite cool relative to the high temperature combustion gases within the combustion liner 14, is admitted in a controlled manner to the interior of the combustion liner to support combustion and provide cooling therein. In accordance with the present invention, this relatively cool air is also used for cooling certain turbine elements exposed to the high temperature combustion products.

An annular nozzle diaphragm indicated generally by 20 in FIG. 1 is located at the downstream end of the combustion liner 14 for supplying the hot products of combustion to a row of turbine buckets 21 at the proper velocity and at the proper angle, from the combustion gases are redirected by an annular nozzle diaphragm 22 to a row of turbine buckets 23. The turbine buckets 21 are peripherally mounted on a turbine wheel 24 which, along with its associated shaft 25 and a second turbine wheel 26 having the buckets 23 mounted thereon, is rotatably mounted on the engine axis 27 by suitable mounting means including a bearing arrangement 28. The turbine unit comprising the wheels 24 and 26 and the shaft 25 drives the compressor (not shown) of the engine 10.

With reference still directed to FIG. 1, it will be noted that the entire flow of combustion products passes through the annular nozzle diaphragms 20 and 22 and over the rows of turbine buckets 21 and 23. If the gas turbine engine 10 is to operate at the efficiency and power levels desired in modern gas turbine engines, the combustion products must be discharged from the combustion liner 14 at temperatures higher than those which can be withstood without cooling by vanes made of currently available materials. The present invention makes this desired efficiency possible by providing adequate cooling in a highly efficient manner for all vane portions. In the illustrated embodiment, the cooling arrangement of the invention is applied only to the second stage nozzle diaphragm 22, but it will become clear as this description proceeds that the invention could be utilized in conjunction with either the nozzle diaphragm 20 or the turbine buckets 21 and 23.

Before turning attention to the precise manner by which the present invention controls and directs the flow of cooling fluid throughout the nozzle diaphragm 22, it will be well to describe briefly the general arrangement and construction of the nozzle diaphragm 22. Specifically, although the nozzle diaphragm 22 functions as a unitary, annular structure comprising a plurality of circumferentially spaced airfoil-shaped vanes 30 extending radially between an inner annular band 31 and an outer annular band 32, it is actually formed of a number of abutting arcuate segments 33, one of the segments being illustrated by FIG. 2. More particularly, each segment is formed as a single entity including a number of the vanes 30 and inner and outer arcuate band segments 35 and 36 interconnecting the ends of the vanes 30. A support flange segment 37 is also formed as an integral portion of the segment, the flange segment 37 projecting radially inward from the downstream side of the inner band segment 35. When assembled, adjacent ones of the band segments 35 and 36 fit together to form the complete annular nozzle diaphragm 22 of FIG. 1, the flange segments 37 forming an annular support flange 38 upon which an annular seal ring 39 may be mounted. The annular seal ring 39 extends upstream from the support flange 38 and cooperates with a rotating, annular seal structure 40 carried between the turbine wheels 24 and 26 to prevent undesired leakage of hot gases around the vanes 30 inwardly of the inner annular band 31. Similarly, each segment 33 includes outer flange segments 41 and 42 which, when the diaphragm 22 is assembled, cooperate to form support flanges 43 and 44 which support and locate the diaphragm 22 within the engine casing 11. The segments 33 as just described are preferably of cast construction, but it will occur to those skilled in the art as this description proceeds that other forms of construction could be used within the teaching of the present invention.

As best illustrated by FIGS. 2-5, the nozzle diaphragm segments 33 have radial passages 50 which extend through the band segments 35 and 36 and the vane body 51 of each vane 30. The hollow vane body 51 of each vane 30 is an airfoil-shaped member having a convex side wall 52 and a concave side wall 53 interconnecting axially spaced upstream leading and downstream trailing edges 54 and 55, respectively. As best shown by FIG. 5, the aerodynamic shape of the vane body 51 at the leading edge 54 is rounded and rather blunt while the trailing edge region is tapered and quite thin. To cool these critical leading and trailing edge regions, as well as the mid-chord region, in accordance with the present invention, each vane body is formed with heat exchange passages therein. To form these passages, the inner end of the hollow interior 50 of each vane body 51 is substantially closed by means of a wall plate 60 secured to the inner band segment 35 by welds or other suitable securing means, and a thin-walled, sheet metal insert 61 is inserted radially into the hollow interior 50 through the opening in the outer band segment 36. The insert 61 is a substantially closed envelope which is open only at its outer end 62, except for small throttling openings 63 which will be described presently. The insert 61 which is shaped to conform generally with the interior configuration of the vane body 51 and is held in closely spaced relationship with the side walls 52 and 53 by radial ribs 64 and 65 formed integrally with the side walls and projecting therefrom into the hollow vane interior 50, thus encloses a centrally disposed plenum 66 within the vane body 51. The plenum 66 is a radial passage extending substantially the entire radial extent of the vane body 51.

The insert 61 and the vane side walls 52 and 53 along with their integral ribs 64 and 65 also define a number of other radial passages including a leading edge plenum 70 intermediate the centrally disposed plenum 66 and the leading edge 54 and passages 71, 72, and 73 intermediate the centrally disposed plenum 66 and the convex side wall 52, the concave side wall 53, and the trailing edge 55, respectively. After the insert 61 is positioned within the vane body 51, an outer wall plate 74 is secured to the outer band segment 36 by welds or other suitable securing means to substantially close the leading edge plenum 70, the ribs 64 extending the entire length of the passage 50. The ribs 65, however, terminate in spaced relationship to the end wall 60 such that the passages 71, 72, and 73 are in fluid flow communication with each other at all times, the passage means thus formed by these passages being in fluid flow communication with small bleed openings 75 in the inner end wall 60. To admit compressed air from the annular combustion space 15 for cooling the vane body 51 and the inner band 31 (see FIG. 1), an inlet opening 76 is provided in the outer band segment 36. The inlet opening 76, which is the unclosed portion of the passage 50, permits the flow of cooling air to the centrally disposed plenum 66 and the passages 71, 72, and 73.

A multiplicity of passages 80 are provided in the leading edge region of the vane body 51, the illustrated vane having a row of radially spaced passages 80a interconnecting the leading edge plenum 70 and the exterior convex side wall surface, a row of radially spaced passages 80b interconnecting the leading edge plenum 70 and the exterior concave side wall surface, and two rows of radially spaced passages 80c interconnecting the leading edge plenum and the exterior wall surface at the leading edge 54. These passages 80 have very small cross-sectional areas and are disposed along axes forming acute angles with the exterior wall surfaces such that cooling air discharge through the passages 80 forms a relatively thin layer on the exterior vane surfaces to provide film cooling.

A multiplicity of passages 82 are also provided in the tapered and thin trailing edge region, the radially spaced passages 82 extending axially between the radial trailing edge passage 73 and substantially the entire trailing edge 55. These closely spaced passages are also of very small diameter. To complete the description, it should be noted that the insert 61 has a plurality of relatively small throttling openings 63 therein for the purpose of providing communication between the centrally disposed plenum 66 and the leading edge plenum 70.

In operation, relatively cool high pressure air from the combustion space 15 is admitted through the inlet opening 76 in the outer band segment 36 to the centrally disposed plenum 66 and the passage means comprising the passages 71, 72, and 73. From the centrally disposed passage 66, the cooling air flows through the throttling holes 63 to the leading edge plenum 70 from which it is discharged through the leading edge passages 80. The cooling air flowing through the passages 71, 72, and 73 is discharged through the trailing edge passages 82 and the bleed openings 75. The cooling air discharged through the bleed openings 75 is used to cool the inner band 31 and the seal elements 39 and 40 and to restrict undesired leakage of combustion gases through the seal elements. The manner in which the cooling air is discharged through the bleed openings will be described at a later point in this description.

The vane structural arrangement just described provides an adequate and extremely efficient vane cooling system. For example, at the leading edge region where cooling problems have heretofore been most acute, the present invention provides both convection and film cooling with the same cooling fluid. In addition, the convection cooling at the leading edge is greatly enhanced by impingement cooling and extended heat transfer area. By way of explanation, it is pointed out that the perforations or openings 63 in the insert 61 are throttling holes; since the openings 63 are sized to throttle the flow of cooling fluid, the fluid is accelerated as it flows between the centrally disposed plenum 66 and the leading edge plenum 70. As a result, the accelerated fluid strikes the interior wall surfaces of the leading edge plenum as a plurality of high velocity jets and thereby causes extreme turbulence and high heat transfer coefficients at the leading edge. This so-called impingement cooling thus causes high convection heat transfer rates at the leading edge. From the leading edge plenum 70 the cooling air is discharged through the openings 80 which, because of their angular orientation, provide much greater convection heat transfer area than would be present if the passages were normal to the wall surfaces. This extremely effective convection cooling is supplemented by film or boundary layer cooling since the angular orientation of the passages 80 causes the discharged cooling fluid to be trapped in the boundary layer and thereby form in thin layers on the exterior vane surfaces in the leading edge region, thus insulating the vane body 51 from the hot combustion products.

In the mid-chord region where the insulating film of cooling fluid may begin to separate from the exterior surfaces of the convex and concave side walls 52 and 53, additional cooling is provided by convection heat transfer to cooling fluid flowing through the radial passages 71 and 72. This particular arrangement for mid-chord cooling is quite satisfactory from an efficiency viewpoint since the same cooling fluid is used subsequently for cooling the inner band 31 and possibly the trailing edge 55 in the manner hereinafter described.

In the critical trailing edge region, convection cooling is provided by cooling fluid flowing through the radial passage 73 and the small diameter passages 82 extending axially between the radial passage 73 and the entire radial extent of the trailing edges 55. As in the case of the passages 80 in the leading edge region, the passages 82 provide a concentration of heat exchange area for extremely effective convection heat transfer. The cooling fluid supplied to the passages 82 is that supplied to the passage 73 through the inlet 76 and possibly a portion of that supplied to the passages 71 and 72.

As indicated previously, a portion of the cooling air flowing through the passages 71, 72, and 73 is discharged through the bleed openings 75 to cool the inner band 31 and block the seal elements 39 and 40. More particularly, the cooling air discharged from the vane body enters an annular space 85 inwardly of the inner band 31 and upstream of the annular flange 38 and, with respect to the main flow path through the engine, upstream of the seal elements 39 and 40. The presence of the cooling fluid in the annulus 85 assures that leakage of hot gases will not occur through the close seal clearances and provides cooling for the seal elements. In addition, the cooling air is discharged from the annulus 85 to the main flow passage through small bleed openings 86 located in the inner band segments 35 between adjacent vanes 30. These openings 86, as the openings 80 in the vane body 51, are disposed along axes forming acute angles with the band wall surfaces such that the cooling air forms a relatively thin layer on the outer surface of the inner band to provide an insulating layer on the band.

To permit efficient utilization of cooling fluid, it is essential that the openings 80 in the leading edge region, the openings 82 in the trailing edge region, the bleed openings 75, the band openings 86, the insert 61, and the ribs 64 and 65 be proportioned to permit sufficient, but not excessive, flow through the various portions of the nozzle diaphragm 22. This can be accomplished by controlling the number and individual flow areas of the various openings, the cross-sectional flow areas of the internal vane passages, and, of course, the pressure differential between the interior regions of the vane body and the static hot gas pressure on the exterior vane surfaces. In other words, the cooling requirements of the various vane portions will dictate the precise relative proportions of the vane elements. For example, in one design the passages may be proportional such that the entire cooling air flow for the trailing edge passages 82 is supplied by passage 73 while in another design a portion of the cooling air flow to the passages 82 is supplied by the passages 71 and 72. By making small changes in the relative proportions of the elements comprising the stator assembly of this invention, the turbine designer will be able to accommodate an extremely wide range of cooling requirements.

It will be obvious to those skilled in the art that the cooling arrangement of this invention is not limited to use in turbine nozzle diaphragms; it may of course be applied with equal utility to turbine buckets for gas turbine engines and to vanes utilized in other high temperature turbomachines such as extremely high pressure compressors. It will also be obvious to those skilled in the art that the general arrangement of this invention may be used if desired for related purposes such as for anti-icing compressor inlet struts and vanes. It will also be obvious that the invention may be used in vanes formed differently from that of the illustrated diaphragm sections, which are of cast construction with passages formed by an insert. For example, the passages could be drilled or formed during the casting process. In addition, cooling fluid could be used, if desired, for cooling the outer band as well as the inner band.

It will thus be seen that this invention provides for a high temperature turbomachine a stator assembly utilizing substantially the minimum amount of cooling fluid consistent with adequate cooling of substantially the entire asesmbly. Furthermore, the cast diaphragm segments with vane passages formed by an insert are relatively simple and inexpensive to manufacture and durable and dependable in operation.

It will be understood that the invention is not limited to the specific details of the construction and arrangement of the particular embodiment illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In an axial flow turbomachine, a vane comprising:
   a radially extending hollow vane body, said vane body including convex and concave side walls interconnecting axially spaced upstream leading and downstream trailing edges,
   partition means within said vane body dividing the hollow interior of said vane body into a plurality of radially extending heat transfer regions, said regions including a centrally disposed plenum, a leading edge plenum intermediate said centrally disposed plenum and said leading edge, and first, second, and third radial passages intermediate said centrally disposed plenum and, respectively, said convex side wall, said concave side wall, and said trailing edge,
   inlet means at an end of said vane body for admitting heat transfer fluid to said centrally disposed plenum and said first, second, and third passages.
   end wall means interconnecting said convex and concave side walls at the end of said vane body opposite said inlet means so as to at least substantially close said end and thereby prevent unobstructed discharge of heat transfer fluid through said end,
   and means including said end wall means interconnecting said first, second, and third radial passages at said end of said vane body opposite said inlet means to provide fluid communication between said passages within said vane body,
   throttling means between said centrally disposed plenum and said leading edge plenum for accelerating the heat transfer fluid and for directing the high velocity heat transfer fluid from said centrally disposed plenum against the interior wall surfaces of said leading edge plenum to generate high convection heat transfer coefficients at the leading edge,
   first outlet means for discharging heat transfer fluid from said leading edge plenum to the exterior of said vane body,
   and second outlet means comprising at least in part a multiplicity of radially spaced, axially extending passages interconnecting said third radial passage and the trailing edge of said vane body,
   whereby heat transfer fluid admitted to said first and second passages may enter said third passage and be discharged through said trailing edge passages after traversing the length of said vane body within said first and second passages.

2. A vane as defined by claim 1 in which said first outlet means comprises a multiplicity of radially spaced passages in the leading edge region of said vane body interconnecting said leading edge plenum and the exterior wall surfaces, said passages being disposed along axes forming acute angles with the exterior wall surfaces such that heat transfer fluid discharged from said leading edge plenum through said passages forms a relatively thin layer of heat transfer fluid on the exterior wall surfaces in the leading edge region of said vane body.

3. A vane as defined by claim 2 in which said partition means dividing the hollow interior of said vane body into a plurality of heat transfer regions comprises:
   a radially extending, thin-walled insert disposed within said vane body and forming therein said centrally disposed plenum,
   and spacing means between said insert and the side walls of said vane body to position said insert within said vane body and to divide the space between said insert and the side walls into said leading edge plenum and said first, second, and third radial passages, the wall portion of said insert between said centrally disposed plenum and said leading edge plenum being perforated to provide said throttling means, and said insert, said spacing means, and said first and second outlet means being proportioned to control the flow of heat transfer fluid through said plurality of heat transfer regions in accordance with the heat transfer requirements of the respective portions of said vane body.

4. In an axial flow turbomachine, a vane comprising:
a radially extending hollow vane body, said vane body including convex and concave side walls interconnecting axially spaced upstream leading and downstream trailing edges, a radially extending, thin-walled insert disposed within said vane body and forming therein a centrally disposed radially extending plenum, spacing means comprising radially extending ribs projecting into the hollow interior of said vane body from the interior surfaces of said side walls to contact said insert to position said insert within said vane body and to divide the space between said insert and the side walls into a radially extending leading edge plenum intermediate said centrally disposed plenum and the leading edge, and first, second, and third radial passages intermediate said centrally disposed plenum and, respectively, said convex side wall, said concave side wall, and said trailing edge, inlet means at an end of said vane body for admitting heat transfer fluid to said centrally disposed plenum and said first, second, and third passages, end wall means interconnecting said convex and concave side walls at the end of said vane body opposite said inlet means, said first, second, and third radial passages being interconnected adjacent said end wall means, the wall portion of said insert between said centrally disposed plenum and said leading edge plenum being perforated to provide throttling means for accelerating the heat transfer fluid and for directing the high velocity heat transfer fluid from said centrally disposed plenum against the interior wall surfaces of said leading edge plenum to generate high convection heat transfer coefficients at the leading edge, first outlet means for discharging heat transfer fluid from said leading edge plenum to the exterior of said vane body, said first outlet means comprising a multiplicity of radially spaced passages in the leading edge region of said vane body interconnecting said leading edge plenum and the exterior wall surfaces, said passages being disposed along axes forming outer angles with the exterior wall surfaces such that heat transfer fluid discharged from said leading edge plenum through said passages forms a relatively thin layer of heat transfer fluid on the exterior wall surfaces in the leading edge region of said vane body, and second outlet means comprising at least in part a multiplicity of radially spaced, axially extending passages interconnecting said third radial passage and the trailing edge of said vane body, said insert, said spacing means, and said first and second outlet means being proportioned to control the flow of heat transfer fluid through the interior of said hollow vane body in accordance with the heat transfer requirements of the respective portions of said vane body, whereby heat transfer fluid admitted to said first and second passages may enter said third passage and be discharged through said trailing edge passages after traversing the length of said vane body within said first and second passages.

5. In a high temperature axial flow turbine, an annular turbine nozzle diaphragm comprising:
a plurality of circumferentially spaced, radially extending vanes, inner and outer band means circumferentially connecting the radially inner and outer ends, respectively, of said vanes, each of said vanes including a hollow vane body including convex and concave side walls interconnecting axially spaced upstream leading and downstream trailing edges, said leading and trailing edges extending radially between said inner and outer band means, a radially extending, thin-walled insert disposed within said vane body to form therein a centrally disposed plenum, radially extending ribs projecting into the hollow interior of said vane body from the interior surfaces of said convex and concave side walls to contact said insert to position said insert within said vane body and to divide the space between said insert and the side walls into a leading edge plenum intermediate said centrally disposed plenum and said leading edge, and first, second, and third radial passages intermediate said insert and, respectively, said convex side wall, said concave side wall, and said trailing edge, inlet means at an end of said vane body admitting cooling fluid to said centrally disposed plenum and said first, second, and third passages, end wall means interconnecting said convex and concave side walls at the end of said vane body opposite said inlet means, the radial ribs between said first, second, and third passages terminating in spaced relation to said end wall means to provide fluid flow communication between said radial passages, the wall portion of said insert between said centrally disposed plenum and said leading edge plenum being perforated to provide throttling means for accelerating the cooling fluid and for directing the high velocity of cooling fluid from said centrally disposed plenum against the interior wall surfaces of the leading edge plenum to generate high convection heat transfer coefficients at the leading edge, first outlet means for discharging cooling fluid from said leading edge plenum to the exterior of said vane body, and second outlet means for discharging cooling fluid from said first, second, and third radial passages to the exterior of said vane body, said insert, said radial ribs, and said first and second outlet means being proportioned to control the flow of cooling fluid through the interior of said vane body in accordance with cooling requirements of the respective portions of the vane body.

6. An annular turbine nozzle diaphragm as defined by claim 5 in which:
said first outlet means comprises a multiplicity of radially spaced passages in the leading edge region of said vane body interconnecting said leading edge plenum and the exterior wall surfaces, said passages being disposed along axes forming acute angles with the exterior wall surfaces such that cooling fluid discharged from said leading edge plenum through said passages forms a relatively thin layer of cooling fluid on the exterior wall surfaces in the leading edge region of said vane body, and said second outlet means comprises at least in part a multiplicity of radially spaced, axially extending passages interconnecting said third radial passage and the trailing edge of said vane body.

7. In a high temperature axial flow turbine, an annular turbine nozzle diaphragm assembly comprising:
a plurality of circumferentially spaced, radially extending vanes, inner and outer band means circumferentially connecting the radially inner and outer ends, respectively, of said vanes, a generally cylindrical casing circumferentially surrounding said outer band means in spaced relationship thereto, annular seal means carried by said inner band means and extending radially inwardly therefrom for cooperating with complementary seal means to control leakage around said inner band means, each of said vanes including a hollow vane body including convex and concave side walls interconnecting axially spaced upstream leading and downstream trailing edges, partition means within said vane body dividing the hollow interior of said vane body into a plurality of radially extending heat transfer regions, said regions including a centrally disposed plenum, a leading edge plenum intermediate said centrally disposed plenum and said leading edge, and passage means intermediate said centrally disposed plenum and said side walls downstream of said leading edge, inlet means at the outer end of said vane interconnecting the annulus between said outer band means and said casing and said centrally disposed plenum and said passage means for admitting cooling fluid to said centrally disposed plenum and said passage means from said annulus, end wall means at the inner end of said vane body interconnecting said convex and concave side walls, throttling means between said centrally disposed plenum and said leading edge plenum for accelerating the cooling fluid and for directing the high velocity cooling fluid from said centrally disposed plenum against the interior wall surfaces of said leading edge plenum to generate high convection heat transfer coefficients at the leading edge, first outlet means comprising a multiplicity of radially spaced passages in the leading edge region of said vane body interconnecting said leading edge plenum and the exterior wall surfaces of said vane body for discharging cooling fluid from said leading edge plenum, said passages being disposed along axes forming acute angles with the exterior wall surfaces such that cooling fluid discharged through said passages forms a relatively thin layer of cooling fluid on the exterior wall surfaces in the leading edge region of said vane body, second outlet means comprising a multiplicity of radially spaced, axially extending passages interconnecting said passage means within said vane body and the trailing edge of said vane body for discharging cooling fluid from said passage means, third outlet means in said end wall means at the inner end of said vane body for discharging cooling fluid from said passage means within said vane body, said third outlet means interconnecting said passage means and the annulus located inwardly of said inner band means and upstream of said annular seal means, and passages in said inner band means between adjacent vanes for discharging cooling fluid from the annulus inwardly of said inner band means and upstream of said annular seal means to the nozzle areas between adjacent vanes, said passages being disposed along axes forming acute angles said inner band means such that cooling fluid discharged through said passages forms a relatively thin layer of cooling fluid on said band means, whereby substantially the entire turbine nozzle diaphragm assembly is effectively cooled by cooling fluid admitted by said inlet means.

8. An annular turbine nozzle diaphragm assembly as defined by claim 7 in which said partition means dividing the hollow interior of said vane body into a plurality of heat transfer regions comprises:

a radially extending, thin-walled insert disposed within said vane body and forming therein said centrally disposed plenum, and spacing means between said insert and the side walls of said vane body to position said vane body within said vane body and to divide the space between said insert and the side walls into said leading edge plenum and said passage means, said spacing means further dividing said passage means into first, second, and third radial passages intermediate said insert and, respectively, said convex side wall, said concave side wall, and said trailing edge, the wall portion of said insert between said centrally disposed plenum and said leading edge plenum being perforated to provide said throttling means, and said insert, said spacing means, said first, second, and third outlet means, and the passages in said band means being proportioned to control the flow of cooling fluid throughout said turbine nozzle diaphragm in accordance with the cooling requirements of the respective portions of said assembly.

9. An annular turbine nozzle diaphragm assembly as defined by claim 8 in which said spacing means comprises radially extending ribs projecting into the hollow interior of said vane body from the interior surfaces of said convex and concave side walls to contact said insert and thereby define with said insert and said side walls said leading edge plenum, and said first, second, and third radial passages, the radial ribs between said first, second, and third passages terminating in spaced relation to said end wall means to provide fluid flow communication between said radial passages.

References Cited

UNITED STATES PATENTS

| | | | |
|---|---|---|---|
| 2,559,131 | 7/1951 | Oestrich et al. | 253—39.15 |
| 2,647,368 | 8/1953 | Triebbnigg et al. | |
| 2,859,011 | 11/1958 | Zimmerman | 253—39.15 |
| 2,923,525 | 2/1960 | Creek | 253—39.15 |
| 3,045,965 | 7/1962 | Bowmer | 253—39.1 |
| 3,111,302 | 11/1963 | Bowmer | 253—39.15 |
| 3,191,908 | 6/1965 | Powell et al. | 253—39.15 |
| 3,246,469 | 4/1966 | Moore. | |

FOREIGN PATENTS

| | | |
|---|---|---|
| 833,770 | 4/1960 | Great Britain. |

EVERETTE A. POWELL, JR., *Primary Examiner.*